Jan. 24, 1956 D. H. ANDREWS ET AL 2,732,533
ADAPTER FOR CAPACITANCE METERS
Filed May 12, 1954 4 Sheets-Sheet 1

Fig.1.

INVENTOR.
DAVID H. ANDREWS
BENJAMIN BERNSTEIN
BY ROBERT J. WOHL
George Sipkin
Lee P Huntzberger
ATTORNEYS:

Jan. 24, 1956   D. H. ANDREWS ET AL   2,732,533
ADAPTER FOR CAPACITANCE METERS

Filed May 12, 1954                                   4 Sheets-Sheet 3

Fig.5.

INVENTOR
DAVID H. ANDREWS
BENJAMIN BERNSTEIN
BY ROBERT J. WOHL
George Sipkin
Lee J. Huntzberger
ATTORNEYS Jan. 24, 1956    D. H. ANDREWS ET AL    2,732,533
ADAPTER FOR CAPACITANCE METERS
Filed May 12, 1954    4 Sheets-Sheet 4

INVENTOR.
DAVID H. ANDREWS
BENJAMIN BERNSTEIN
BY ROBERT J. WOHL

ATTORNEYS.

2,732,533

ADAPTER FOR CAPACITANCE METERS

David H. Andrews, Glen Cove, and Benjamin Bernstein and Robert J. Wohl, New York, N. Y.

Application May 12, 1954, Serial No. 429,411

13 Claims. (Cl. 339—156)

(Granted under Title 35, U. S. Code (1952), sec. 266)

The invention described herein may be manufactured and used by or for the Government of the United States of America for governmental purposes without the payment of any royalties thereon or therefor.

This invention relates to an adaptor for capacitance meters permitting the mounting of a multi-pin electronic component. The adaptor affords excellent shielding from electrostatic fields external thereto and minimal distributed capacity permitting accurate capacity measurements. It is a convenient and accurate tool for use in measuring interelectrode capacities of electronic tubes in particular, and interelement capacity of plug-in electronic components in general. This invention makes it possible to obtain repeatable results.

Capacitance meters are commercially available. They are offered by several manufacturers and differ objectively in terms of range, accuracy, and design of input terminals. This invention is concerned with small magnitude capacity measurements such as are encountered between or among the electrodes of vacuum tubes. The magnitude of such capacity is on the order of micromicrofards and extends down to magnitudes which are a few ten-thousandths of a micromicrofarad. Though meters exist which are capable of measuring capacity in this very low range a considerable problem evolves from the presence of stray electric fields, and also from stray capacities which are introduced by the measuring equipment and added to the actual capacity measured when the electrical component is mechanically mounted adjacent to and electrically connected in association with the capacitance meter. Stray capacity is introduced by exposure of proximate base pens to each other; it is introduced by unshielded leads and other interconnecting means between the elements of an electrical component and the input terminals of the capacity meter; it is introduced by faulty or improper electrical connections; it is introduced through mutual capacity between the observer and any element of the electrical component, i. e., any electrode of a tube.

It is desirable to reduce this stray capacity down to a level on the order of $10^{-18}$ farads so as not to introduce appreciable percentage error. Another problem faced in capacity measurements performed on an electrical component having a plurality of elements is the need either to isolate or to fix at a reference potential each of the elements or electrodes not directly involved in a capacity measurement. For example, assuming that it is desired to measure the grid-plate capacity of a triode, not only would the two electrodes have to be electrically connected to the input terminals of the capacity bridge by suitable connecting means characterized by minimum stray capacity and maximum shielding from extraneous fields, but it would be equally necessary to either ground the cathode and/or heater of the triode and/or isolate them by proper shielding from external stray electric fields, the latter leaving the cathode and/or the heater floating. This involves the use of additional means for carrying out the grounding or isolating of the elements not involved directly in the capacity measurement. To make all these electrical connections with proper care directed to the influence of stray capacity and stray electric fields on the accuracy of the measurements can take considerable time of skilled personnel. To obtain repeatable results has been a problem. This invention serves to virtually eliminate the above-mentioned problems. The invention comprises an adaptor or more generally a fixture for mounting plug-in type electrical components. The modification of the adaptor disclosed is designed for use with a specific type of commercially available capacitance meter, namely, the Western Electric Capacitance Meter D-160936. It may be modified for use with other types of capacitance meters. The adaptor disclosed includes the equivalent of a tube socket designed to accommodate a specific type of vacuum tube base. It further includes a pair of rigid adaptor connecting or mounting terminals whereby it may be plugged into the input terminals of the capacitance meter for which it is designed. The adaptor is constructed with an eye towards maximum shielding and minimum stray capacity and repeatability. Each tube socket contact of the adaptor is connected within the adaptor body to a corresponding one of a first series of externally available terminals. A second series of terminals mounted externally on the adaptor is internally connected to one of the two terminals plugged into the capacitance meter. A third series of terminals mounted externally on the adaptor is internally connected to the other of the two connecting or output terminals of the adaptor which is plugged into the capacitance meter. Each of the three series include the same number of terminals. The body of the adaptor is metallic and in use is grounded. Specific connecting means are provided for use in combination with the adaptor proper for connecting each of the terminals of the tube socket either to one of the capacitance meter terminals or to the other of the capacitance meter terminals or if to neither of the above, additional means are available for use with the adaptor for isolating (in special cases) selected terminals and still other means for grounding selected terminals. An example of a special where a terminal is isolated is where one electrode such as a cathode of a tube is connected to two pins. One of the associated terminals is isolated in that case.

An object of this invention is to provide an adaptor for capacitance meters.

A further object is to provide an adaptor for capacitance meters for minimizing stray capacitance.

A further object is to provide an adaptor for capacitance meters for improving shielding, and for minimizing stray capacitance, and to keep contact resistance down to a negligible quantity.

A further object is to provide an adaptor for capacitance meters for permitting accurate capacitance measurements between or among the elements of an electrical component.

A further object is to provide an adaptor for capacitance meters for use in connection with capacity measurements in the range of a small fraction of a micromicrofarad.

A further object is to provide an adaptor for capacitance meters for use in production line and testing of completed tubes and more generally electrical components.

A further object is to provide an adaptor for capacitance meters to permit capacitance measurements on electrical components having plug-in terminals.

A further object is to provide an adaptor for capacitance meters to permit quick and accurate repeatable measurements of interelectrode capacities of electronic tubes provided with plug-in base.

A further object is to provide an adaptor for capacitance meters to permit measurements of interelectrode capacities of an electrical component under conditions wherein all electrodes of the electrical component not directly involved in the capacitance measurements are either isolated or grounded by the adaptor.

Other objects and many of the attendant advantages of this invention will be readily appreciated as the same becomes better understood by reference to the following detailed description when considered in connection with the accompanying drawings wherein:

Fig. 3 is a cross-sectional view, with parts shown in elevation; taken along the intersecting planes 3—3 of Fig. 1.

The capacitance adaptor disclosed is made of commercially available conducting and insulating materials. The conducting material is generally brass throughout except for the use of beryllium copper as a resilient contact material. The insulating material may be polystyrene or linen Bakelite. It is emphasized, however, that the choice of materials is not critical and therefore materials are not described in detail.

The body 12 of the capacitance adaptor 10 is externally formed in the shape of a circular cylinder. The body 12 includes a plurality of coaxially stacked elements 14, 54, 86, 144 and 176 fastened together to form a composite unit. The uppermost element of the body 12 is a circular channel 14. The inner wall 16 of the channel 14 is uninterrupted. It presents a continuous cylindrical surface. The outer wall 18 of the channel 14 is formed with a circular series of radial bores 22; it is also formed with a circular series of radial screw holes 24. The axes of each series are coplanar defining planes perpendicular to the axis of the channel 14. Flat-head screws 26 seat within the screw holes 24.

The adaptor 10 shown herein is designed for accommodating a 14 pin cathode-ray tube; therefore there are fourteen spaced bores 22 formed in the channel 14, the spacing between each corresponding to the spacing of the pins on the base of the tube for which the adaptor 10 is designed. Secured within each of the bores 22 formed in the channel 14 is a shield 28 in the form of a stepped cylindrical sleeve-like member 32. Press-fitted within the reduced portion of the shield 32 is a flanged insulating sleeve 34. The insulating sleeve 34 is formed with a coaxial bore 36. The length of the reduced portion of the shield 32 is such that when the latter is secured within an opening 22 in the channel 14 the end of the shield 32 is flush with the inside surface of the outer wall 18 of the circular channel 14. Each shield 32 is fixed to the channel 14 by soldering, or the like, as shown at 38. The latter serves to ensure good contact between shield 32 and the body 12 of the adaptor thereby fixing the shields at the same potential as the body 12.

A bridging ring 42 insulated from body 12 formed with fourteen correspondingly spaced threaded bores is coaxially mounted inside the channel 14. The mounting means for the bridging ring 42 includes fourteen terminal screws 44. Each of the terminal screws 44 is formed with a fillister head 46, an elongated central shank 48 and a relatively short threaded portion 52. The fillister head 46 serves as a contact terminal, the shank 48 serves as a spacing-locating means for the bridging ring 42, while the threaded end portion 52 engages within one of the fourteen threaded openings in the ring 42. The diameter of the shank 48 is such that it rotates freely within the bore 36 of the insulator sleeve 34. The material from which the ring 42 is formed is a resilient copper alloy. The resilient property of the ring serves to preclude loosening of the assembly of ring and terminal screws after all the screws are made tight.

Figure 4:
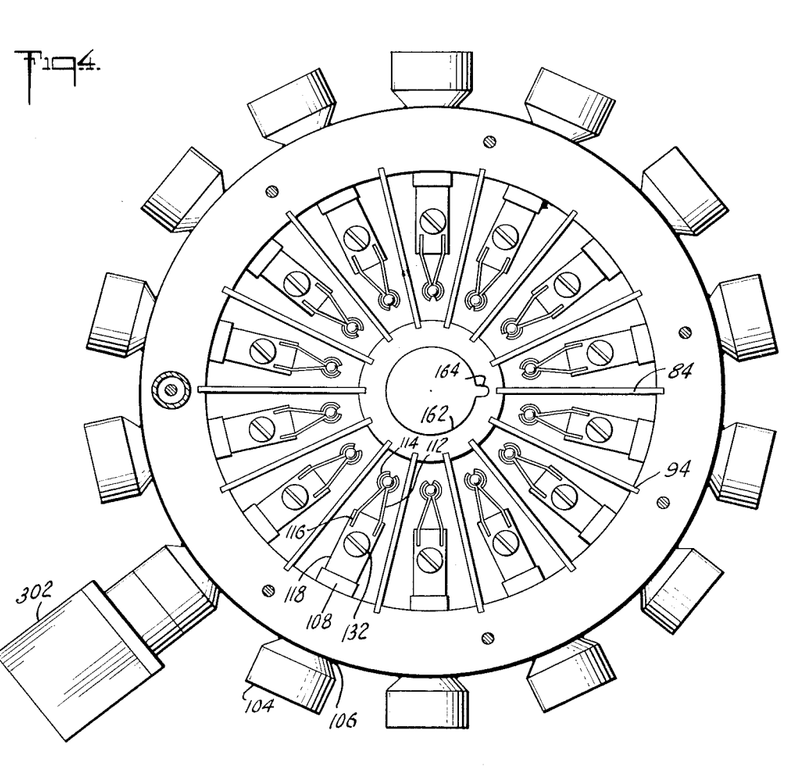
Fig. 4 is a cross-sectional view, with parts shown in elevation, taken along the plane 4—4 of Fig. 2.

Channel 14 is secured to a mounting ring 54. The mounting ring 54 includes a cylindrical portion 58 and a disk-like portion 56, at one end of the cylindrical portion 58, and integral therewith. The cylindrical portion 58 is internally and externally stepped to provide an annulus 62. When the annulus 62 is brought into registration with the circular channel 14, the inner and outer surfaces of the channel 14 and the cylindrical portion 58 align and are substantially continuous. The inner surface of circular channel 14 wipes continuously along the entire surface of annulus 62 contiguous thereto. A plurality of longitudinal bores 64 are formed in the mounting ring 54 and are countersunk at the annulus end of the cylindrical portion 58. A coaxial step 66 is formed in the mounting ring 58 at the end opposite the annulus 62. Additional coaxial steps 68 and 72 are formed on opposite sides of the disk-like portion 56 of the mounting ring 54. Each of the steps serve to simplify alignment at assembly but in addition serve a far more important purpose in that they virtually preclude leakage paths ensuring excellent shielding. This property will be further referred to as this description proceeds. Fourteen openings 74 are formed in the disk-like portion 56 of the mounting ring 58 for the purpose of receiving the base pins of the tube 76 for which it is designed. The shape of each opening 74 shown in Fig. 3 is frustro-conical. The configuration shown is for the purpose of accommodating insulating extensions on the base of the tube 76 of the same configuration. The openings 74 need to be designed for each specific tube base accommodated. Since it is an essential feature of this invention that the stray distributed capacitance be kept at a minimum, the design of the openings 74 for accommodating a tube that does not have the frustro-conical extensions on its base would be such that it could accommodate insulating spacers. This feature is not shown on the drawing but merely suggests a modification in accordance with other type tube bases. Furthermore, where the tube being accommodated does not include the frustro-conical extensions on the base as shown in Fig. 3 and the pins are of the same length as shown in Fig. 3, it is important that the base pins engage their respective socket elements to substantially the same extent by extending the latter up through the openings 74 so that they are substantially flush with the upper surface of the disk-like portion 56. The openings 162, 164 formed centrally of the disk-like portion 56 serve to accommodate the key on the base of the tube 76. Fourteen longitudinal tapped bores 78 are formed in the disk-like portion 56 of the mounting ring 54. The axis of each tapped bore 78 is radially aligned with corresponding ones of the openings 74. Formed in the lower surface of the disk-like portion 56 of the mounting ring 54 is a series of radial slots 82. The depth of the radial slots 82 is substantially equal to the depth of the steps 66 and 72 formed in the lower surface of the disk-like portion 56 of mounting ring 54. The slots 82 are cut in the annular raised portion of the disk-like member 56. The slots are arranged between the radial planes including each set of openings 74 and 78, respectively. The purpose of the slots 82 is to receive one edge of rectangular shielding member 84, shown in Fig. 4.

A cylinder 86 is coaxially secured to the mounting ring 54. The outside diameter of the cylinder 86 is equal to that of the outside diameters of the mounting ring 54 and the channel 14. The cylinder 86 is formed with an annular step 88 at one end. Fourteen radial bores 92 are formed in the cylinder 86; the axes of the bores 92 are all in the same plane; the latter is perpendicular to the axis of the cylinder 86. The wall of the cylinder 86, is formed internally with longitudinal slots 94 each of which are located between a pair of adjacent bores 92. The slots 94 serve the same purpose as the slots 82 in the disk-like portion 56 of the mounting ring 54, in that they receive one edge of each rectangular shield 84. The cylinder 86 is further formed with a plurality of longitudinal threaded bores 96. Elongated machine screws 98 extend through the countersunk bores 64 in the mounting ring 54 and threadedly engage within the threaded opening 96 of the cylinder 86. The radial bores 92 formed in the wall of the cylinder 86 are stepped as at 102. A shield 104 in the form of a stepped sleeve-like member 104 is pressfitted within each opening 92 with the end of the reduced portion of the shield 104 abutting the step 102 of the opening 92. Each shield 104 is secured in place by soldering 106, or the like. The shields 104 are stepped for the same reason as are the shields 32 which reason is to reduce stray capacitance between the shield which is grounded to the body of the adaptor 12, and the concentric contact terminal therein. The inside diameter of the reduced portion of the shield 104 is identical to the diameter of the reduced portion of the opening 92. An insulating sleeve 108 is mounted within the reduced portion of shield 104 and the adjacent reduced portion of the bore 92. When assembled the shield 32 is longitudinally aligned with the corresponding shield 104, and the enlarged portion of each, external to the body of the adaptor 10, is identical.

For engaging the pins of a tube 76 mounted in the adaptor, there are provided resilient wiping contacts 112. Resilient wiping contacts 112 are assembled in pairs for engaging the pins of tube 76 that is mounted in the adaptor. The wiping contacts 112 are formed of beryllium copper or its equivalent and are so shaped at one end that when assembled, each pair defines a cylindrical open- for receiving and electrically engaging the pin of a tube such as 76. The wiping contacts 112 are flared as shown at 114 to permit easy entry of the tube base pins. The ends of the wiping contact 112 opposite the ends defining the cylindrical opening, are pressfitted into slots 116, formed in conducting blocks 118. The surface of each block 118 and opposite the surface formed with the slots 116 (Fig. 4) is centrally formed with a threaded bore 122. Centrally of the conducting block 118 and transverse to the threaded bore 122 there is formed a bore 124 of substantially larger diameter than the threaded bore 122. Pressfitted into the bore 124 of the conducting block 118 is a flanged insulating sleeve 126. At assembly, the conducting block 118 bearing the wiping contacts 112 in combination with an insulating spacer 128 and a screw 132 engaging both, is brought up against the lower surface of the disk-like portion 56 of the mounting ring 54 so that the end of the screw 132 is brought into registration with one of the tapped openings 78 in the disk-like portion 56. Before tightening the screw 132 and after preliminary assembly of each of the conducting blocks 118 to the disk-like portion 56 by means of its associated screw 132, a tube base is inserted part way through the opening 74 while each of the spring-like contacts 112 are individually brought into engagement with the respective pins of the tube base. Subsequent to that, the tube 76 is inserted all the way. With each of the contacts 112 held in proper position by the pins of the tube 76 the mounting screws 132 are finally tightened. For added security a lock washer 134 is included under the head of each screw 132. Though edges of the wiping contacts 112 are shown in close proximity to the disk-like portion 56, suggesting considerable distributive capacity between the two, it is to be noted that the total surface comprising the edges of the wiping contacts 112 so involved is very small, whereby the distributed capacitance resulting from this proximity is likewise very small. Because of the limitation imposed by the length of the pins on tube 76, it is necessary that the ends of the wiping contacts 112 be brought close to the surface of the disk-like portion 56 of the mounting ring 54. If only the contact end of each wiping contact 112 were brought close to the disk-like portion 56, the contact pressure between the wiping contact 112 and the associated pins would be substantially reduced thereby introducing error into the measurements due to contact resistance. After assembly of the blocks 118 by means of the screws 132 to the disk-like portion 56, screws 134 are inserted into the sleeves 108 and are threadedly engaged within the threaded bores 122 of the blocks 118. Each screw 134 has a fillister head 136, on elongated shank 138 and a threaded end portion 142. As described above, the fillister head 136 serves as a contact terminal; the shank 138 serves as a spacer and the threaded portion 142 serves to engage and secure the block 118. When screw 134 is tightened the insulating sleeve 108 is forced into abutment with the conducting block 118.

A disk-like member 144 is provided for mounting on the end of cylinder 86. The disk-like member 144 is stepped centrally at 146 to provide a centrally located cylindrical depression and is further stepped at 148 and 152 adjacent the periphery thereof. A cylinder 154 is secured to the disk 144 by means of accurate locating pins 156. The key of an electronic component is adapted to be received in the cylinder 154. Both the disk 144 and the key receiving cylinder 154 are slotted as shown at 157 and 158, respectively, whereby the slots align with the slots 82 and 94 in the disk-like member 56 and the cylindrical member 86, respectively, for mounting the shielding means 84. The key receiving cylinder 154 is centrally bored at 162 for receiving the polarized key on the end of the base of an electronic component, such as a vacuum tube, adapted to be mounted therein. The bored portion 162 is further formed with a locating slot 164 for registration with the polarizing portion of the key inserted therein. Opposite ends of the key receiving cylinder 154 are reduced in diameter as shown at 166 and 168 for registration with the circular depression 72 in the disk-like member 56 and the circular depression 146 in the disk 144. The disk 144 is further formed with a plurality of counter-sunk screw receiving openings 172. At assembly screws 174 secure the disk 144 to the cylindrical member 86.

A cap-like base 176 is provided at the end of the adaptor 12. The cap-like base 176 is formed with fourteen radial openings 178 whose axes are in a common plane, perpendicular to the axis of the cap-like base 176, and whose spacing corresponds to the spacing of the corresponding openings in members 54 and 86. A stepped cylinder 182 is secured within each of the radial openings 178 in the cap-like base 176. An insulating flanged sleeve 184 is assembled within each stepped cylinder 182. Each stepped cylinder is secured in place within an opening 178 by soldering 188, or the like. Assembled centrally within the cap 176 is a ring 192. The ring 192 is formed with fourteen spaced radial tapped bores 194 and is secured within the cap 176 by means of fourteen screws 196. Each of the screws 196 is formed with a fillister head 202, an elongated shank 204 and a threaded end portion 206. The flanged sleeves 184 are formed to provide a sliding fit for the screws 196. The screws 196 are assembled with the ring 192 and tightened so that the latter is centrally supported within the cap-like base 176. The ring 192 serves as an electrical bridging member.

Terminals are brought out externally of the adaptor 12 from each of the bridging rings 42 and 192. The terminal brought out from bridging ring 192 is shown at 212. The terminal 212 is secured on the adaptor 12 by means of a coaxial, tubular, grounded shield 214 but is insulated from shield 214. One end of the tubular shield 214 is secured within an opening 216 formed within the cap 176 being soldered in place as shown at 218. The tubular shield 214 is internally stepped to provide a portion of reduced inside diameter adjacent the end secured within the cap 176. An internally-threaded insulating flanged sleeve 222 is assembled within the portion of reduced inside diameter of tubular shield 214. The terminal rod 212 is externally threaded adjacent one end for threaded engagement with the flanged insulating sleeve 222. A washer 224 is assembled over the threaded extending end of the terminal rod 212. Terminal rod 212 is secured in place by means of a locknut 226 which is tightened against the washer 224. Electrical continuity between the terminal rod 212 and the bridging ring 192 is provided by means of a resilient tongue 228. The tongue 228 is soldered to the bridging ring 192.

The diameter of the ring 192 is made considerably smaller than the diameter of the ring 42 to provide for decreased distributed capacitance. This is accomplished by the rearranged area-distance relationship of the ring and supporting screws relative to the grounded body of the adaptor 12. It has been found in connection with one particular capacitance meter that one of its two input terminals is more sensitive than the other. Therefore, the distributed capacitance of that terminal relative to ground need to be minimized. The design of ring 192 and its supporting screws afford minimum distributed capacity.

Figure 5:
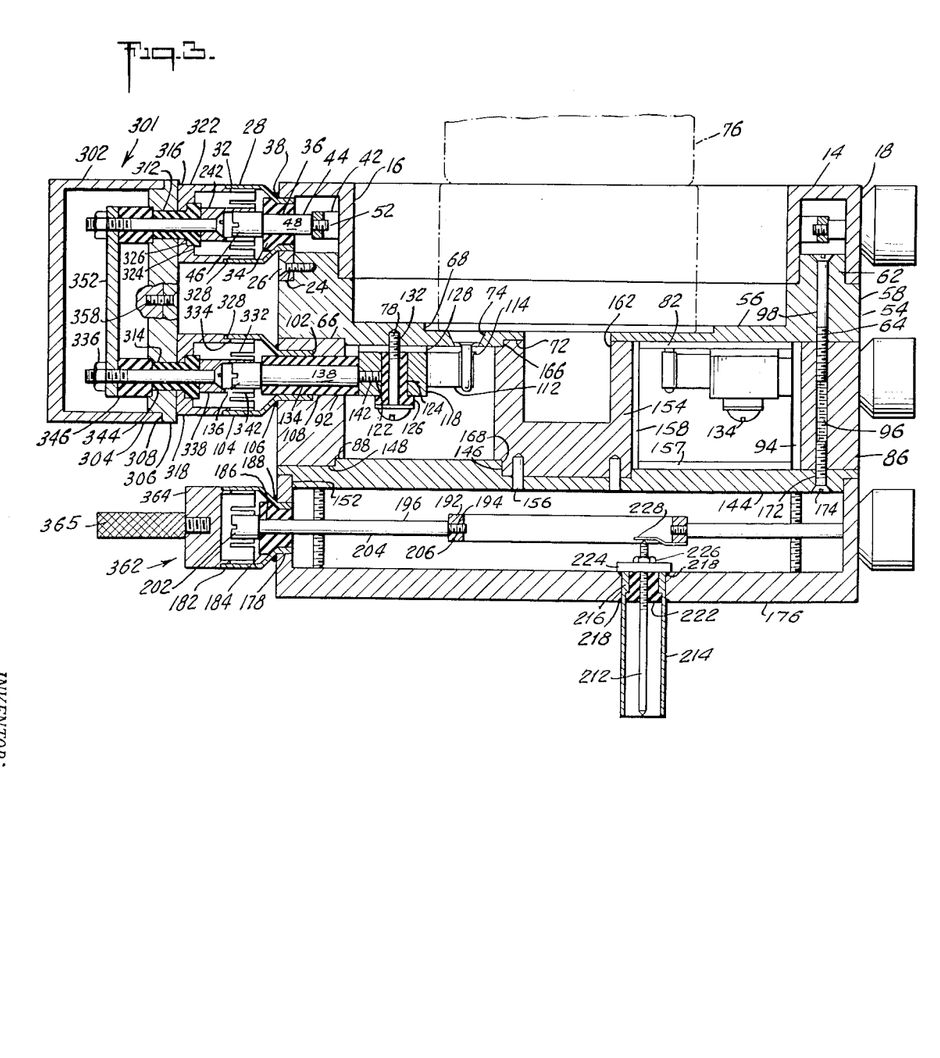
Fig. 5 is a fractional cross-sectional view, with parts shown in elevation, taken along the plane 5—5 of Fig. 1.

The other terminal of the adaptor 12 is brought out externally from the bridging ring 42 by the arrangement shown in detail in the cross-sectional view of Fig. 5. It includes a terminal rod 232 threaded at one end. Terminal rod 232 is mounted within a pair of telescoped tubular shields 234 and 236. The tubular shield 234 is secured within a longitudinal bore 238 formed in the assembled adaptor by means of soldering or the like 242 to the cylindrical member 86.

The end of the tubular shield 234 remote from the tubular shield 236 is stepped to provide a portion of reduced inside diameter shown 252. A flanged insulating sleeve 254 is assembled within the stepped portion of the tubular shield 234. The flanged insulating sleeve 254 is internally threaded. The tubular shield 236 is secured within to the cap-like base 176 by means of solder 258 or the like. Intermediate the ends of the tubular shield 236 there is provided a circular inside shoulder 262. Assembled within the tubular shield 236 and bearing against the circular shoulder 262 is a stepped insulating sleeve 264. The terminal rod 232 is assembled within the tubular shields 234 and 236 by threaded engagement with the flanged sleeve 254; the terminal rod 232 extends through the flanged sleeve 254 and through an adjacent insulating washer 266. A lock nut 268 is assembled on the threaded end of the terminal rod 232 and is tightened against washer 266. A resilient tongue 272 is secured to the ring 42 by means of soldering 274 or the like, and also abuts the end of terminal rod 232 to afford electrical continuity between the two.

By means of this arrangement the uppermost circular series of terminals are connected to one of the output terminals of the adaptor 12 and the lowermost circular series of terminals are connected to the other of the output terminals of the adaptor 12. The central circular series of terminals are arranged to be connected to single ones of the base pins of an electrical component plugged into the adaptor. Since each of the terminals in the central circular series of terminals are electrically distinct from one another and are associated with only one of the pins of the electrical component plugged into the adaptor, it is possible to connect any one or plurality of the pins of the electrical component plugged into the adaptor to either one of the output terminals 212 and 232. Remaining pins of the electrical component either may be isolated or grounded in any combination.

A bridging means 302 is provided for connecting any one of the central series of terminals to either one of the output terminals 212 or 232. Each bridging means 302 includes a rectangular cover 304 and a base 306. The base 306 is reduced in thickness at its perimeter to provide a continuous step 308. Base 306 is further formed with a pair of stepped bores 312 and 314, adjacent opposite ends of the base 306. A pair of connectors 316 and 318 are secured to the outer surface of the base 306 in axial alignment with the openings 312 and 314, respectively. Each of the connectors 316 and 318 are circular and include an axial portion 322 and a transverse portion 324. The transverse portion is axially formed with a stepped bore 326. The portion of the stepped bore 326 of smaller diameter forms a continuation of the corresponding portion of the stepped bore in the base 306. The outside diameter of the axial portions of the connectors 316 and 318 is reduced at 328. The portion of reduced diameter is longitudinally divided by a series of equally spaced slots 332 formed therein. The slots 332 in the portion of reduced diameter of each of the connectors 316 and 318 terminate intermediate the ends of the portion of reduced diameter, leaving a fraction of its length unslotted as shown at 334. The reduced and slotted axial portion in each of the connectors 316 and 318 affords the connectors the characteristics of yieldability and resilience. Each of the connectors 316 and 318 are secured to the base 306 by corresponding screw and nut assemblies 336. Assembled under the heads of the screws 336 are coaxial electrically distinct connectors 338 and 342, respectively. Each of the connector portions 338 and 342, respectively, are axially slotted at intervals as shown at 342. Suitable insulating spacers comprising flanged sleeves 344 separate the inner terminal from the corresponding outer terminal. A bridging bar 352 is secured at the end of each of the screw assemblies 336 in abutment with insulator sleeves 346. The cover 302 of the bridging assembly is secured to the base 306 by means of a series of screws one of which is shown at 358. The screws extend through the reduced portion of the base 306 into the wall of the cover 302.

Each bridging assembly 301 is adapted to interconnect any pair of adjacent terminals that are longitudinally aligned. Since all the connecting elements of this invention are rigid, uniform, and have well-defined seats, repeatable results are obtained. In Fig. 3 the bridging assembly 301 is shown connecting one of the terminals in the central series of terminals to the terminal of the upper series of terminals which is directly above. Since the central series of terminals of the adaptor are directly connected to the pins of an electrical component mounted in the adaptor, each bridging assembly 301 serves to connect any one of the pins of the electrical component plugged into the adaptor to either the bridging ring 42 or the bridging ring 192. Therefore, through the use of the adaptor it is possible to measure the capacitance between any pair of elements of the electrical components mounted in the adaptor or between any two combinations of elements of the electrical component plugged into the adaptor.

It is important to obtain measurements under controlled conditions. To do this it is necessary to prevent any remaining elements of the electrical component mounted in the adaptor from floating electrically. The alternatives are that part or all of the remaining electrical elements be either grounded or isolated. A grounding plug is not shown on the drawing but corresponds in structure to the connector portions of the bridging assembly 301. A suitable grounding connector may comprise a unitary cylindrical element, completely metallic embodying a concentric portion connector. It may further include a suitable finger grip for convenience in handling. By the use of a grounding connector, selected one(s) of the terminal screws in the central series of terminals may be connected to the body of the adaptor and thereby to ground. None of the upper series of terminals and none of the lower series of terminals are grounded because that results in grounding the corresponding input terminal(s) of the capacitance meter on which the adaptor is mounted.

An additional connector assembly 362 is provided for shielding the remaining ones of the terminals in the upper series and the lower series of terminals after bridging connections and grounding connections are completed. Since any one of the central series of terminals can only be connected either to one of the upper series of terminals or to one of the lower series of terminals but not to both by means of a bridging bar 301, one of the terminals longitudinally aligned therewith is left free. For example, in Fig. 3, a bridging assembly 301 connects one of the center series of terminals to the terminal directly above. The terminal directly below in the lower series of terminals is not connected into the measurement circuit. To prevent the introduction of stray capacitance to the meter through the free terminal, the shielding assembly 362 is connected to the unused terminal. The shielding assembly 362 includes a unitary cylindrical metallic cap 364 reduced and longitudinally slotted in the same manner as the connectors 316 and 318. It also includes a manual knurled grip 365. When mounted in place, the unused terminal is surrounded by a ground shield precluding stray capacity from being introduced into the associated capacity meter due to the unshielded terminal.

Throughout this description, considerable emphasis has been laid to stepped surfaces between adjacent mating parts. The importance of this arrangement is here stressed again as an important feature for precluding leakage. Besides ensuring closure, its stepped surfaces also serve to lengthen any possible leakage path between the one side and the opposite side of a pair of mating connecting parts.

Figure 1:
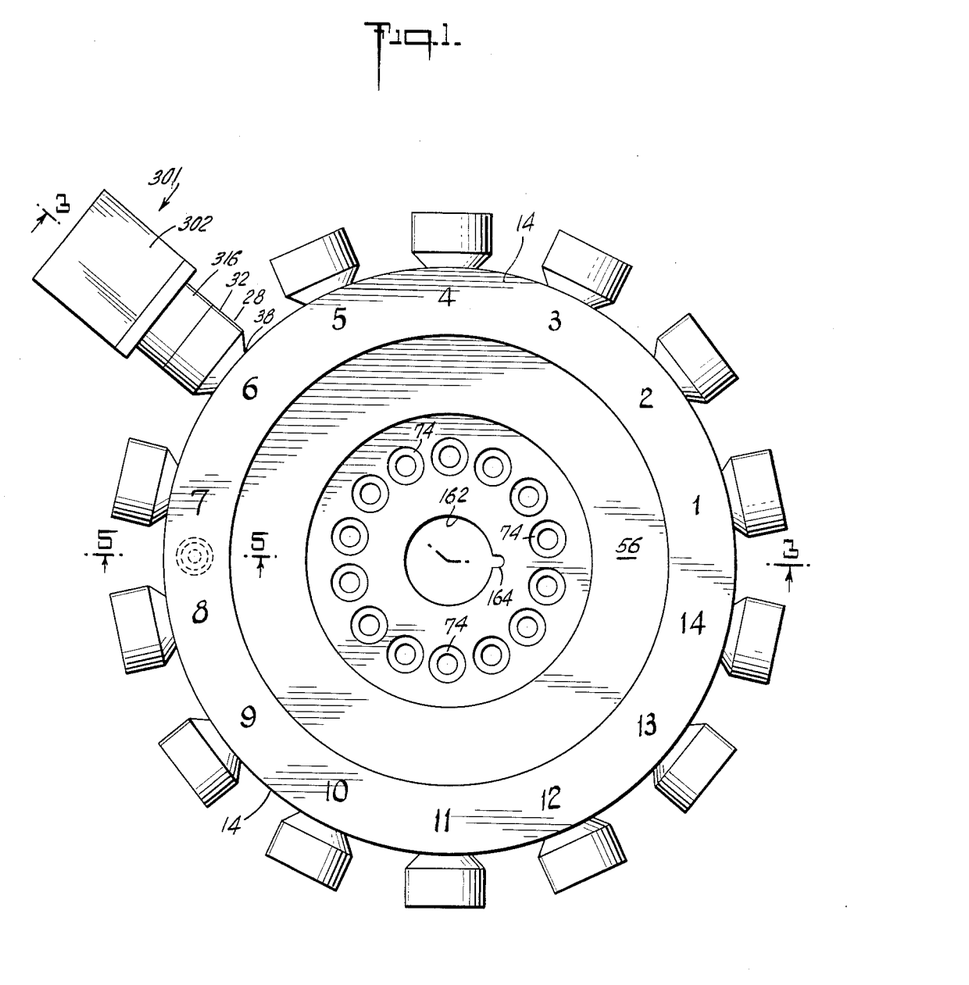
Fig. 1 is a top plan view of a capacitance adaptor according to this invention.
Figure 2:
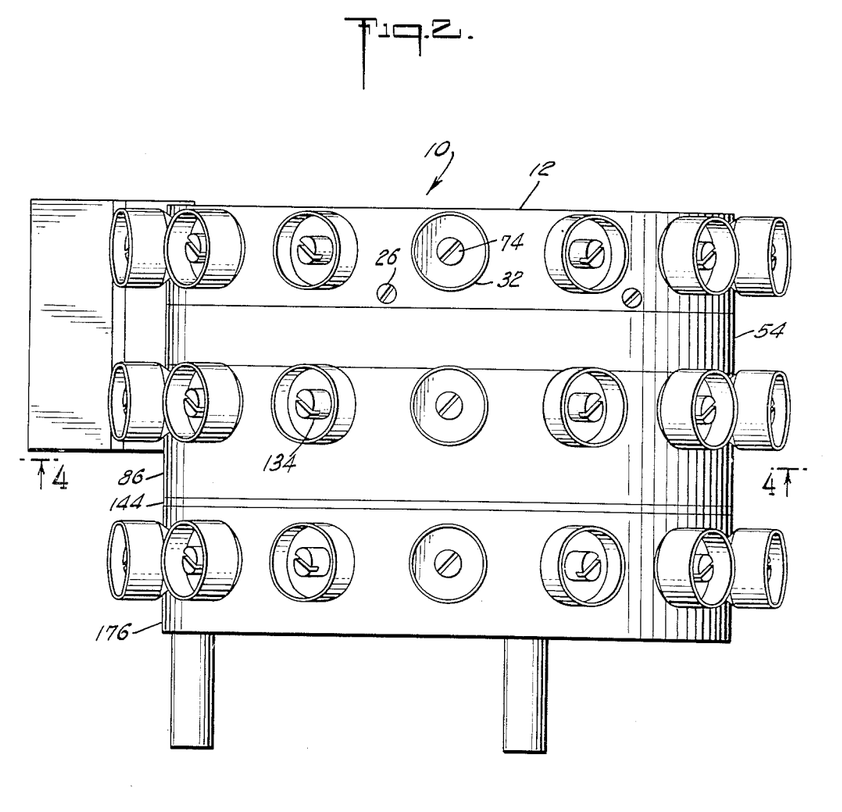
Fig. 2 is a side view, in elevation, of the adaptor shown in Fig. 1.

In operation, the adaptor described is designed for mounting one particular type of pin-type base borne by a plug-in electrical component such as, for example, a cathode ray tube. With the adaptor terminals 212 and 232 positively seated in the input terminals of a capacitance meter, more accurate and more rapid capacitance measurements between any pair of elements of the electrical component mounted in the adaptor is made possible. For convenience suitable indicia markings may be etched in the upper surface of the channel 14 (Fig. 1). Since electrical components are polarized, the indicia markings aid in making the necessary electrical connections. Because of the shielding afforded by the adaptor and the careful spacing between all parts that are at different levels of potential, the adaptor prevents the introduction of any appreciable error due to stray capacitance. The capacitance adaptor likewise introduces negligible contact resistance. It serves as a convenient means for making capacitance measurements to substantially the limits of sensitivity and accuracy afforded by the associated capacitance meter herein referred to but not described. The capacitance meter has not been described since many commercial capacitance meters are in existence and this adaptor may be modified to cooperate with meter(s) other than the ones for which the adaptor described herein is specifically designed.

In the adaptor described the central series of terminals of the adaptor are arranged for direct connection to the respective pins of the electrical component mounted in the adaptor. This arrangement represents a compromise. By means of this arrangement all the bridging assemblies 301 can be identical. If the three series of terminals were rearranged so that what is now the central series were made one of the end series (and this modification is well within the purview of this invention) it would be necessary to make bridging assemblies in two lengths. However, an advantage that would accrue would be to have the seat for the electrical component form an outer boundary of the adaptor reducing the time needed for manual manipulation in seating the electrical component. Each alternate possibility has an advantage and a disadvantage, as above described, over the other. Only one has been described.

In operation it has been found the adaptor yields excellent results. A capacitance meter with which it has been used, is a commercial Western Electric capacitance meter Model D-160936.

Obviously many modifications and variations of the present invention are possible in the light of the above teachings. It is therefore to be understood that within the scope of the appended claims the invention may be practiced otherwise than as specifically described.

We claim:

1. A capacitance adaptor for mounting an electrical component having a pin-type base and for electrically connecting selected elements or combinations of elements of the electrical component to the input terminals of a capacitance meter while minimizing stray capacitance and minimizing contact resistance; said adaptor comprising a cylindrical body, a pair of shielded, insulated, parallel plug-type terminals fixed to said body and extending from one end thereof whereby said adaptor may be plugged into corresponding input terminals of a capacitance meter, a first bridging ring, a first series of coplanar equally spaced terminals mounted on said body with a portion of each accessible externally of said body, insulating means and grounded-to-said-body electrostatic shielding means for the accessible portion of each of said first series of terminals, each of said first series of terminals being electrically connected to and rigidly supporting said first bridging ring in said body, means for connecting said first bridging ring to one of said parallel pair of plug-type terminals whereby each of said first series of terminals is connected to said one of said parallel pair of plug-type terminals, a second bridging ring, a second series of coplanar equally spaced terminals equal in number to said first series of terminals and mounted on said body in axial alignment with said first series of terminals with a portion of each of said second series of terminals accessible externally of said body, insulating means and ground-to-said-body electrostatic shielding means for the accessible portion of each of said second series of terminals, each of said second series of terminals being electrically connected to and rigidly supporting said second bridging ring in said body, means for connecting said second ring to the other of said parallel pair of plug-type terminals whereby each of said second series of terminals is connected to said other of said parallel pair of plug-type terminals, a third series of coplanar equally spaced terminals equal in number to said first and second series of terminals and mounted on said body in axial alignment with said first and said second series of terminals with a portion of each of said second series of terminals accessible externally of said body, said body being centrally formed with axial bores equal in number to said series of terminals for defining a socket for mounting an electrical component having a pin-type base, electrical connecting means for each of said third series of terminals disposed is cooperative relationship with corresponding ones of the axial bores formed in said body for defining the socket whereby the base pins of an electrical component mounted in said adaptor is electrically connected to corresponding ones of said third series of terminals, bridging means for electrically connecting any of said third series of terminals to axially aligned corresponding terminals of either said first or said second series of terminals, grounding means for selected ones of said third series of terminals not directly involved in a capacitance measurement, shielding means for any of said first and said second series of terminals not directly involved in a capacitance measurement, said body being suitably formed to preclude leakage, and all of said terminals and connecting means being so disposed within said body whereby stray capacitance introduced into a measurement is negligible relative to the sensitivity of an associated capacitance meter.

2. A capacitance adaptor comprising a body, said body being formed to mount a particular pin-type base; a plurality of shielded, insulated, parallel plug-type terminals fixed to said body and extending from one end thereof; a plurality of bridging means numerically equal to said plug-type terminals; means for interconnecting corresponding ones of said plug-type terminals and said bridging means; a plurality of series of terminals fixed to said body, one series for each of said bridging means and electrically and mechanically connected thereto within said body, the number of terminals in each series of terminals being equal to the number of pins on the pin-type base adapted to be mounted by said body; and an additional series of terminals numerically equal to each of said other series, fixed to said body, separate means connected to each of the terminals comprising said additional series of terminals and adapted to be connected to corresponding pins of a pin-type base mounted by said body; means for grounding to said body selected ones of said additional series of terminals; means for isolating selected ones of said plurality of series of terminals; and means for interconnecting selected single terminals in said additional series of terminals with selected single terminals in said plurality of series of terminals.

3. A capacitance adaptor comprising a body of conductive material formed with a plurality of adjacent openings to provide a socket adapted to mount a particular pin-type base of an electrical component; a first plurality of terminals, a second plurality of terminals, a third plurality of terminals, each of said pluralities of terminals comprising the same number of terminals as the number of openings, said pluralities of terminals insulatedly fixed to said body in spaced, circular, coaxial series whereby corresponding ones of the terminals in the three series are aligned, and said second series of terminals includes conductor means in registration with respective ones of the openings formed in said body, first and second bridging means for electrically interconnecting said first and third plurality of terminals respectively a plurality of separate bridging means for electrically interconnecting selected ones of said second series of terminals with corresponding ones of either said first or said third plurality of terminals, and first and second adaptor connecting means connected to said first and second bridging means, respectively.

4. A capacitance adaptor comprising a cylindrical conductive body, a pair of insulated, rigid, shielded connecting terminals fixed to said body and extending from one end thereof whereby said adaptor is adapted to be plugged into corresponding terminals of a capacitance meter, a first plurality of insulated, shielded terminals fixed to said body and circularly arranged in a transverse plane and electrically connected to one another and to one of said pair of connecting terminals, a second equal plurality of insulated, shielded terminals fixed to said body and circularly arranged in a transverse plane the spacings between corresponding ones of the terminals in said first plurality of terminals and in said second plurality of terminals are equal, said second plurality of terminals being connected to one another and to the other of said pair of connecting terminals, a third equal plurality of insulated, shielded terminals fixed to said body and circularly arranged in a transverse plane with the longitudinal spacing between the three pluralities of terminals being equal, the terminals in said third plurality of terminals being aligned with corresponding terminals in said first and said second plurality of terminals, said body being formed with an equal plurality of openings to provide a receptacle for plug-in type components having a corresponding plurality of base pins, separate means connected to respective ones of said third plurality of terminals and adapted for connecting each of the base pins of a mounted electrical component to corresponding ones of said third plurality of terminals, a plurality of separate, identical, bridging means for separately connecting selected ones of said third plurality of terminals to corresponding terminals of either said first or said second plurality of terminals, grounding means for some of the terminals in said third plurality not otherwise interconnected by bridging means, and isolating caps for some of the terminals in said third plurality not otherwise connected with bridging means and grounding caps.

5. A capacitance adaptor comprising a cylindrical conducting body, a pair of connecting terminals fixed to one end of said body, a first circular series of outside terminals fixed to said body, means inside said body for electrically connecting said first series of terminals to one another and to one of said pair of connecting terminals, a second circular series of outside terminals equal in number to said first circular series of terminals fixed to said body axially spaced from said first series of terminals, means inside said body for electrically connecting said second series of terminals to one another and to the other of said pair of terminals, a third circular series of outside terminals equal in number to said first and second circular series of terminals fixed to said body axially spaced from said first and second series of terminals, said body being formed with openings to provide an axial receptacle for a pin-type plug-in electrical component, separate conductor means connected to each of said third circular series of terminals and disposed in alignment with the openings formed in said body whereby when a pin-type plug-in electrical component is mounted within the receptacle formed by said body, each of the pin terminals on the electrical component is connected to respective ones of said third circular series of terminals, a plurality of separate bridging means for connecting selected terminals of said third circular series of terminals to respective terminals of either said first circular series of terminals or of said second circular series of terminals.

6. An adaptor for a capacitance meter having two terminals, said adaptor comprising a cylindrical body; a pair of shielded, insulated, rigid terminals fixed to said body and extending from one end thereof whereby said adaptor may be connected to the terminals of the capacitance meter; a first bridging ring; a first circular series of coplanar insulated terminals mounted on said body with a portion of each accessible externally of said body; grounded-to-said-body electrostatic shielding means for the accessible portion of each of said first series of terminals; each of said first series of terminals being electrically connected to and rigidly supporting said first bridging ring in said body; means for electrically connecting said first bridging ring to one of said rigid terminals; a second bridging ring; a second circular series of coplanar insulated terminals equal in number to said first series of terminals and in alignment with corresponding terminals of said first series of terminals axially of said body, with a portion of each of said second series of terminals accessible externally of said body; grounded-to-said-body electrostatic shielding means for the accessible portion of each of said second series of terminals; each of said second series of terminals being electrically connected to and rigidly supporting said second bridging ring in said body; means for connecting said second ring to the other of said rigid terminals; a third circular series of coplanar insulated terminals equal in number to said first and second series of terminals and in alignment with the corresponding terminals of said first and second series of terminals axially of said body, with a portion of each of said third series of terminals accessible externally of said body; said body being centrally formed with axial bores equal in number to the terminals in each series, for defining a socket for mounting a component having a pin-type base; electrical connecting means for each of said third series of terminals disposed in registration with corresponding ones of the axial bores and adapted to electrically connect the base pins of an electrical component to corresponding ones of said third series of terminals; bridging means for electrically connecting any of said third series of terminals to corresponding terminals of either said first or said second series of terminals aligned therewith axially of said body; means for grounding to said body selected ones of said third series of terminals to which none of said bridging means is connected; shielding means for any of said first, second, and third series of terminals to which none of said bridging means and none of said grounding means is connected; and shielding means in said body for isolating said third series of terminals from each other and from said first and third series of terminals and for isolating said first from said third series of terminals.

7. An adaptor for a capacitance meter having two terminals, said adaptor comprising; a body formed to mount a particular pin-type base; a plurality of rigid shielded, insulating terminals fixed to said body and extending from one end thereof; a plurality of bridging means numerically equal to said rigid terminals; means for interconnecting each of said rigid terminals to corresponding ones of said bridging means; a plurality of series of terminals fixed to said body, one series of terminals for each of said bridging means; each series of terminals being electrically and mechanically connected to respective ones of said bridging means, within said body; the number of terminals in each series of terminals being equal to the number of pins on the pin-type base adapted to be mounted by said body; an additional series of terminals including the same number of terminals as does each of said other series of terminals, fixed to said body; separate conductor means connected to each of the terminals, respectively, of said additional series of terminals and adapted to be engaged by corresponding pins of a pin-type base mounted by said body; means for grounding to said body selected ones of said additional series of terminals; means for isolating selected ones of said plurality of series of terminals; and means for interconnecting selected single terminals in said additional series of terminals with selected single terminals in said plurality of series of terminals.

8. An adaptor comprising a conductive body formed with three closed chambers electrostatically isolated from each other, and further formed with a plurality of openings extending from outside said body into one of the three chambers, the arrangement of the spacing of the openings corresponding to the spacing of the pins of a pin-type base of an electrical component; a first series of spaced terminals, equal in number to the openings formed in said body, fixed to said body and insulated therefrom and projecting into one of the chambers and also projecting outside said body; a second series of spaced terminals, equal in number to the openings formed in said body, fixed to said body, and insulated from said body and disposed adjacent to said first series of terminals and spaced apart from one another in accordance with the spacing between corresponding terminals of said first series of terminals and projecting into a second of the chambers and projecting outside said body; a third series of spaced terminals, equal in number to the openings formed in said body, fixed to said body, adjacent to said second series of terminals and insulated from said body and spaced apart from one another in accordance with the spacing between corresponding terminals of said first and second series of terminals and projecting into the third of the chambers and projecting outside said body; a first bridging member in one of the three chambers and connected to all of said terminals of the series that project into that one chamber and is supported thereby in the center of that one chamber; a second bridging member in another of the chambers and connected to all of said terminals of the series that project into the last-mentioned chamber and is supported thereby in the center of the other chamber; a plurality of resilient contacts equal to the number of openings formed in said body, being disposed in the remaining one of the three chambers, each being connected to the end of a respective one of said terminals of the series that project into the last-mentioned chamber and is supported thereby in registration with a respective one of the openings formed in said body, a plurality of electrostatic shielding means mounted in the last-mentioned chamber and cooperating with said body to shield each connected resilient contact and terminal in the last-mentioned chamber from all the other connected resilient contacts and terminals in the last-mentioned chamber; first and second electrical connecting means connected to said first and second bridging members, respectively, and projecting outside of said body, and adapted for connection to the terminals of a capacitance meter; and a plurality of separate shielded bridging means for separately connecting terminals of said third series of terminals to respective terminals either of said first series of terminals or of said second series of terminals.

9. An adaptor as defined in claim 8 wherein said conductive body has a cylindrical shape and wherein all of said terminals are fixed radially to said body, and the openings formed in said body are directed longitudinally of said body through one end thereof.

10. An adaptor as defined in claim 8 wherein said first and second electrical connecting means that are connected to said first and second bridging members, respectively, and that are adapted for connection to the terminals of a capacitance meter, are rigid.

11. An adaptor as defined in claim 8 wherein the chamber of said body into which the openings extend is formed with a plurality of pairs of opposed slots equal to the number of openings whereby each of said plurality of electrostatic shielding means is recessed into opposed slots in the chamber.

12. An adaptor as defined in claim 8 wherein each of said plurality of shielded bridging means is rigid.

13. An adaptor as defined in claim 8 wherein said conductive body has a cylindrical shape, said series of terminals are fixed radially to said body, the openings formed in said body are directed longitudinally of said body through one end thereof, said first and second electrical connecting means are rigid, the chamber in said body into which the openings extend is formed with a plurality of pairs of opposed slots equal to the number of openings formed in the body whereby each of said electrostatic shielding means is recessed into the opposed slots in the chamber, and each of said plurality of shielded bridging means is rigid.

References Cited in the file of this patent

UNITED STATES PATENTS

| 2,007,848 | Cromartie | July 9, 1935 |
| 2,448,452 | Morelock | Aug. 31, 1948 |
| 2,458,993 | Hanopol | Jan. 11, 1949 |

FOREIGN PATENTS

| 223,337 | Great Britain | Sept. 25, 1924 |